United States Patent [19]

Erski

[11] Patent Number: 4,692,802
[45] Date of Patent: Sep. 8, 1987

[54] APPARATUS FOR GENERATING OSCILLOSCOPE TRIGGER SIGNALS

[75] Inventor: Richard Erski, Fort Wayne, Ind.

[73] Assignee: NAP Consumer Electronics Corp., New York, N.Y.

[21] Appl. No.: 812,146

[22] Filed: Dec. 23, 1985

[51] Int. Cl.$^4$ .......................................... H04N 17/04
[52] U.S. Cl. ................................ 358/139; 358/150
[58] Field of Search .............. 358/139, 10, 148, 149, 358/150; 324/133, 121 R, 127, 73 PC, 527, 528, 529; 340/658, 659, 660

[56] References Cited

U.S. PATENT DOCUMENTS

| | | | |
|---|---|---|---|
| 2,700,699 | 1/1955 | Kaplan | 358/139 |
| 2,741,722 | 4/1956 | Shields | 358/139 X |
| 3,984,862 | 10/1976 | Volz | 358/139 X |
| 4,117,511 | 9/1978 | Baer et al. | 358/150 |
| 4,417,268 | 11/1983 | LaSota | 358/139 X |

OTHER PUBLICATIONS

"Indicating Frequency Meters", *Radio Amateur's Handbook*, p. 521, ©1963, Byron Goodman, Edt.

Primary Examiner—James J. Groody
Assistant Examiner—Victor R. Kostak
Attorney, Agent, or Firm—Thomas A. Briody; William J. Streeter; Marianne R. Rich

[57] ABSTRACT

Trigger signals both at horizontal and vertical line frequency required for an oscilloscope are derived from the horizontal synchronization output stage of a television receiver without any direct electrical connection to the receiver. A pick-up coil or tuned pick-up circuit is positioned in the vicinity of the receiver. The signals induced in the coil or circuit are applied to a comparator. The output of the comparator is at the required TTL level to provide the horizontal trigger to the oscilloscope. If a vertical trigger is also required, the comparator output is applied to a frequency doubler circuit. The output of the frequency doubler circuit is divided by 525, the so-divided output constituting vertical trigger circuits for the oscilloscope. A monitoring circuit for horizontal sync signals is connected to the comparator output and indicates the presence of horizontal sync signals by activation of a light emitting diode.

9 Claims, 2 Drawing Figures

APPARATUS FOR GENERATING OSCILLOSCOPE TRIGGER SIGNALS

BACKGROUND OF THE INVENTION

1. Field of the Invention

The present invention relates to the obtaining of an external trigger for an oscilloscope and, more particularly, obtaining such an external trigger for observing video waveforms.

2. Description of the Prior Art

When a television receiver is to be serviced, it is necessary to obtain an external trigger signal for observing video waveforms on an oscilloscope. At present this trigger signal is derived by direct electrical contact from the horizontal or vertical synchronization circuits of the receiver. It is thus necessary that the serviceman knows where in the receiving circuitry the horizontal and vertical synchronization signals are available. To obtain this knowledge is time consuming, particularly when the serviceman is required to maintain and/or repair different models and brands of television receivers. In addition, the high voltage present in the horizontal output stage constitutes a danger of physical injury to the serviceman.

SUMMARY OF THE INVENTION

It is an object of the present invention to prevent the possibility of injury to the serviceman, and to decrease the time required for obtaining the external trigger for the oscilloscope. These improvements are to be obtained at a minimum cost and without sacrifice of reliability.

In accordance with the present invention, a pick-up circuit including, in the simplest case, an inductor coil, is positioned in the proximity of an appliance being monitored. A signal is induced in the coil by signals radiated from the appliance, for example the horizontal synchronization signals in a television receiver. These signals are applied to a comparator-amplifier to create a series of pulses in synchronism with the radiated signal, but having the pulse shape and power level required to trigger the oscilloscope.

When the pulse sequence at the output of the comparator is a sequence synchronized to the horizontal line frequency of a television receiver, it may also be desirable to have a vertical trigger signal for the oscilloscope available. In order to generate the vertical trigger signal, the horizontal frequency of the pulse sequence at the comparator output is multiplied by two and the resultant double frequency signal is divided by 525. The so-divided signal constitutes the vertical trigger signal which may be applied to the oscilloscope.

In a preferred embodiment, the pick-up circuit of the present invention can be utilized also to determine the absence or presence of the horizontal synchronization signals in the television receiver. For this purpose, an indicator can be provided which provides a visual or audio output to indicate the presence of horizontal synchronization signals.

The present invention, as well as additional objects and variations thereof, will be better understood upon reference to the following description, taken in connection with the accompanying drawing.

DESCRIPTION OF THE PREFERRED EMBODIMENTS

The present invention results from the discovery that energy radiated from the output stages of the horizontal synchronization circuits in a television receiver is sufficient to allow an oscilloscope to be synchronized to such signals without requiring a physical connection to the horizontal synchronization circuits.

Figure 1:
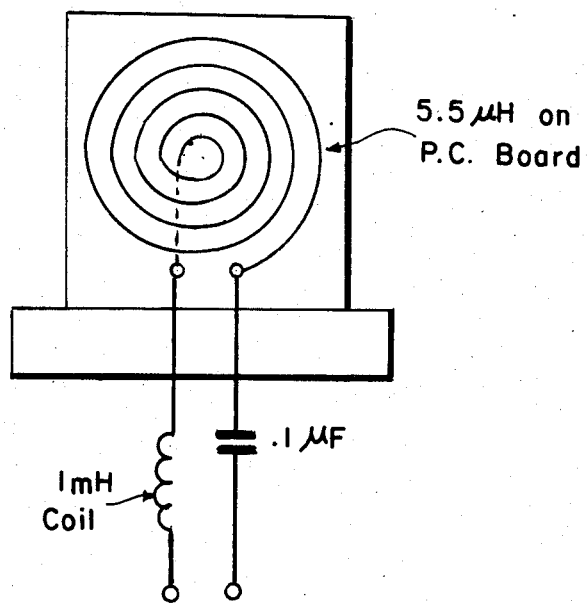
FIG. 1 is a schematic diagram illustrating a preferred form of the pick-up circuit according to the present invention.

The preferred type of pick-up element depends in part upon the ambient conditions. Specifically, where the horizontal frequency (line frequency) of the television set to be moniotred or repaired is the highest frequency which can be picked up, a few turns of wire suffice as pick-up coil. However, when other frequencies, equal or higher than the horizontal frequency of the television receiver are present, then a circuit tuned to the horizontal line frequency should be used. A preferred embodiment of such a circuit is shown in FIG. 1. There, a one millihenry coil 10 is connected in series with a 0.1 microfarad capacitor 12 through a 5.5 microhenry coil 14 on a printed circuit board 16.

Figure 2:
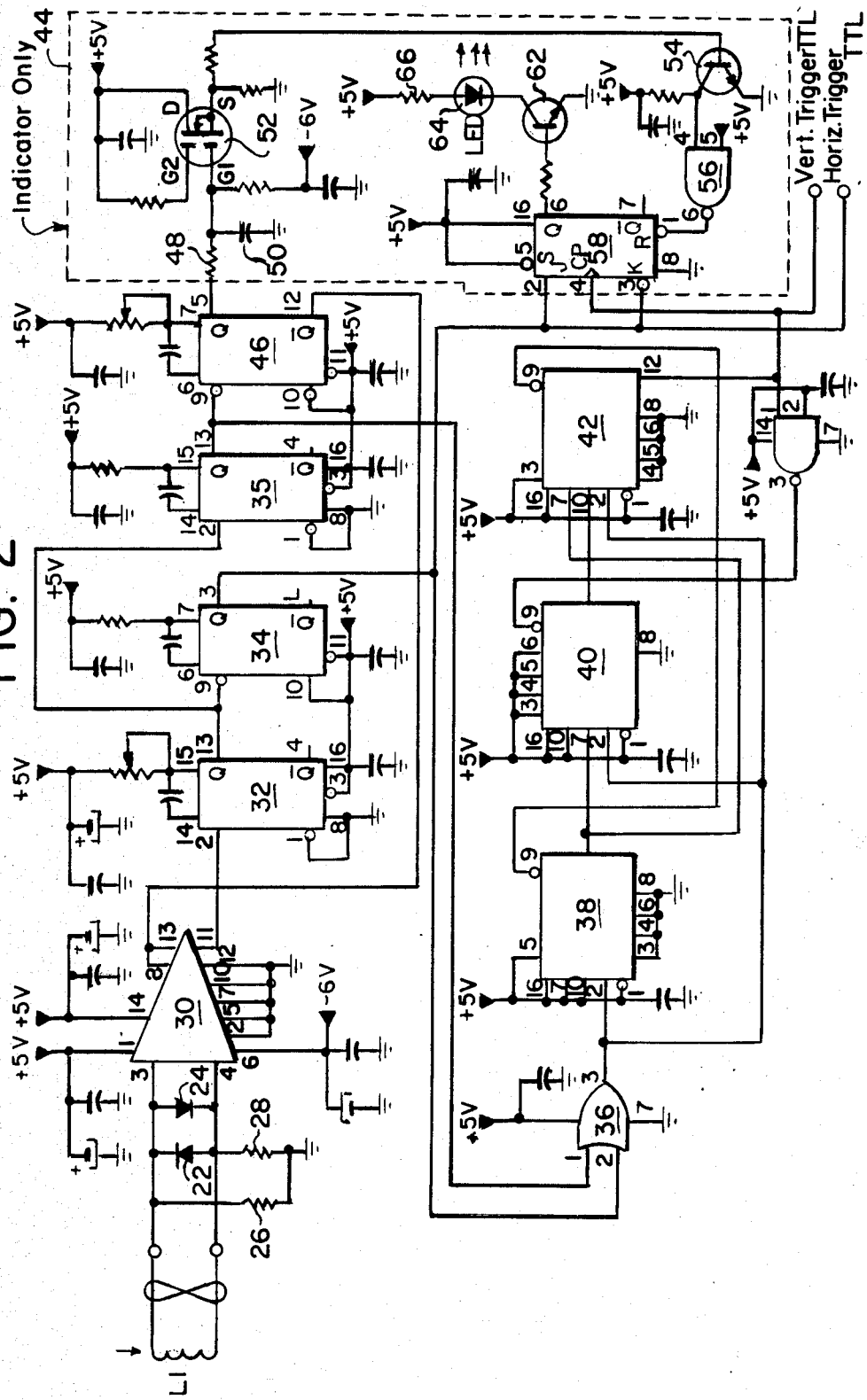
FIG. 2 is a schematic diagram, partially in block form, illustrating the apparatus for generating trigger signals, and an indicator circuit connected thereto.

Referring now to FIG. 2, a coil 20 is illustrated as pick-up coil. Of course, as stated above, if frequencies equal or higher than the horizontal line frequency are present, the circuit of FIG. 1 should be substituted for coil 20. Connected in parallel with coil 20 are oppositely poled diodes 22 and 24. Resistors 26 and 28 connect respective ends of coil 20 to reference or ground potential.

The output of the pick-up circuit is connected to the input of a comparator 30. The signal at the output of comparator 30 is connected to the input of a one shot, 50% duty cycle multivibrator 32. The output of multivibrator 32 is connected to respective inputs of a monostable multivibrator 34 and a monostable multivibrator 35. The output of monostable multivibrator 34 is connected to a first system output terminal at which horizontal trigger pulses are available. It is further connected to one input of an OR gate 36 whose other input receives the output of multivibrator 35. The output of OR gate 36 is applied to three counting stages 38, 40 and 42. The output of counter stage 42 is directly connected to the system output at which vertical trigger pulses are available.

The system may be provided with an optional indicator 44 indicated by broken lines in FIG. 2. The latter receives pulses from monostable multivibrator 35 at an inverting input and has an output connected to the input of the indicator. The input of the indicator circuit is connected to an integrating circuit consisting of a resistor 48 and a capacitor 50. The common point of resistor 46 and capacitor 50 is connected to the first gate of a dual gate MOSFET 52. The source of dual gate MOSFET 52 is connected to the base of a transistor 54. The emitter of transistor 54 is connected to ground potential, while its collector is connected to the first input of a NAND gate 56. The output of NAND gate 56 is connected to the reset input of a JK flip-flop 58. The Q output of JK flip-flop 58 is connected through a resistor 60 to the base of a transistor 62. The emitter of transistor 52 is connected to ground potential, while its collector is connected through a light emitting diode (LED) 64 and a resistor 66 to a source of positive voltage.

In a preferred embodiment, multivibrators 32, 34, 35 and 46 are commercially available units having Philips catalog number 74LS221. The dual gate MOSFET is a BF966, comparator 30 is an NE529, while the counter stages are embodied in units having catalog number 74LS163. JK flip-flop 58 is a 74LS109, and OR gate 36 is 74F32. Finally, NAND gate 56 is catalog number 7400.

The above-described apparatus operates as follows:

The signal radiated from the horizontal output stage of the television receiver is picked up either by a coil 20 or by the tuned circuit illustrated in FIG. 1. It is applied through a balancing and noise suppression stage including diodes 22 and 24 to the input of comparator 30. The output of comparator 30 has the same frequency as the signal picked up by coil 20 or the tuned circuit, but has been converted to the necessary level for TTL logic. Multivibrator 32 is triggered by the signal at the output of comparator 30. It is a one shot multivibrator having a 50% duty cycle, that is the pulse width is equal to one half the interval between pulses. The output of one shot multivibrator 32 is applied to the trigger inputs of monostable multivibrators 34 and 35. Monostable multivibrator 34 is set to trigger on the negative-going edges of the pulse train at the output of multivibrator 32, while multivibrator 35 is set to trigger on the positive-going edges. The output of monostable multivibrator 34 is applied to the output terminal of the device which furnishes the horizontal frequency trigger signals for the oscilloscope. This signal, as well as the output of monostable multivibrator 34 are applied to respective inputs of OR gate 36. The output of OR gate 36 is thus a pulse train at twice the horizontal line frequency. This signal is applied to a counter having counter stages 38, 40 and 42, for division by 525. The counter output is applied to the output of the device at which the vertical frequency trigger signals at TTL levels are to be available.

The device may also be equipped with an indicator (44, FIG. 2) to allow detection of the presence or absence of horizontal synchronization pulses without having to open the television receiver under test. Driving the indicator requires an additional monostable multivibrator 46 connected to the output of monostable multivibrator 35. The former triggers on the negative-going pulse edges of the signal at the output of the latter. When so triggered, multivibrator 46 generates pulses at its $\bar{Q}$ output which have a pulse width slightly exceeding the pulse width of the comparator output pulses.

The $\bar{Q}$ pulses are applied to comparator 30 to strobe its output. This provides immunity to noise.

In the absence of horizontal synchronization signals, the Q output of multivibrator 46 remains high, causing a gradual buildup of positive voltage at gate G1 of dual gate MOSFET 52. The drain-source current increases, driving transistor 54 into the conductive state. This causes a voltage drop at the first input of NAND gate 56. The output of NAND gate 56 switches, setting JK flip-flop 58 to the reset state.

This causes the voltage at the Q output of flip-flop 58 to drop, cutting off transistor 62. The resulting absence of light coming from light emitting diode 64 indicates the lack of a horizontal synchronization signal.

The above clearly indicates that horizontal and vertical synchronization signals for triggering an oscilloscope can be supplied from a television set without any direct electrical contact to the set. It has been found that signals radiated by the horizontal synchronization output stage can be picked up as far as two feet away from the receiver, the orientation of the pick-up circuit not being crucial over a wide range of angles relative to the receiver.

While the invention has been described in particular preferred embodiments, it is not to be limited thereto. Many variations in circuit design and construction and in operation will readily occur to one skilled in the art and are intended to be encompassed in the invention as set forth in the following claims.

I claim:

1. Apparatus for monitoring horizontal synchronization signals generated in a horizontal synchronization circuit of a television receiver, comprising inductive pick-up circuit means located in operative proximity to said television receiver for receiving energy radiated by said horizontal synchronization circuit and for generating pick-up signals in response thereto;

processing means connected to said pick-up circuit means for generating horizontal frequency output signals having a predetermined pulse width in response to said pick-up signals; and output means connected to said processing means for furnishing an output signal indicative of the absence or presence of said pick-up signals.

2. Monitoring apparatus as set forth in claim 1, wherein said output means comprises display means for furnishing a visible display indicative of absence or presence of said pick-up signals.

3. Monitoring apparatus as set forth in claim 2, wherein said display means comprises a light emitting diode.

4. Monitoring apparatus as set forth in claim 1, wherein said processing means comprises comparator means.

5. Monitoring apparatus as set forth in claim 1, wherein said pick-up circuit means comprises a pick-up coil.

6. Monitoring apparatus as set forth in claim 1, wherein said horizontal synchronization signals operate at a horizontal line frequency; and wherein said pick-up means comprises a tuned circuit tuned to said horizontal line frequency.

7. Apparatus for generating trigger pulses at the horizontal line frequency of a television receiver, comprising inductive pick-up circuit means located in operative proximity of said receiver for receiving energy radiated therefrom at said horizontal line frequency and generating pick-up signals in response thereto;

processing means connected to said pick-up circuit means for generating processed pick-up signals having a predetermined pulse shape and power level in response to said pick-up signals, said processed pick-up signals constituting said trigger pulses.

8. Apparatus as set forth in claim 7, further comprising means connected to said processing means for receiving said processed pick-up signals and generating a sequence of double frequency pulses having a first pulse repetition rate equal to twice said horizontal line frequency in response to said processed pick-up signals; and means connected to said frequency doubling means for generating a sequence of output pulses having a second pulse repetition rate equal to said first pulse repetition rate divided by 525, said sequence of output pulses constituting vertical frequency trigger signals.

9. Apparatus as set forth in claim 7, wherein said television receiver operates at a predetermined vertical frequency;
further comprising means connected to said processing means for generating vertical frequency trigger signals synchronized to said vertical frequency of said television receiver in response to said processed pick-up signals.

* * * * *